Aug. 7, 1956  B. W. BARLOW  2,757,990
BEARING AND JOURNAL ASSEMBLIES
Filed Dec. 11, 1953  2 Sheets-Sheet 1

INVENTOR
Benjamin W. Barlow
By Watson, Cole, Grindle &
Watson
ATTORNEYS

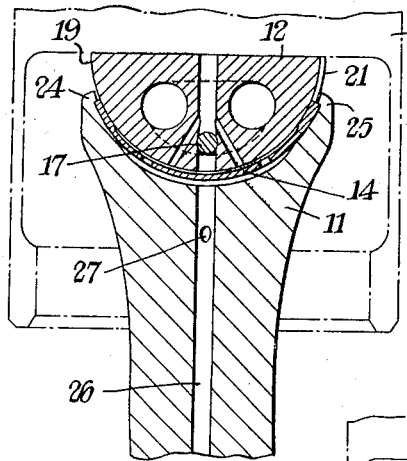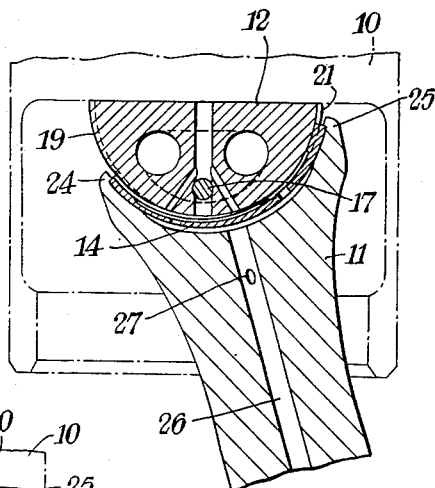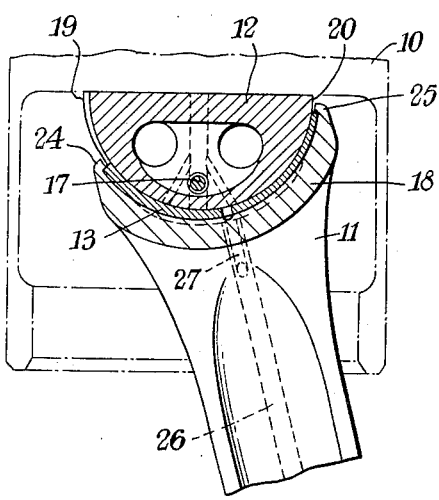

United States Patent Office 2,757,990
Patented Aug. 7, 1956

2,757,990

BEARING AND JOURNAL ASSEMBLIES

Benjamin William Barlow, Wembley, England, assignor to D. Napier & Son Limited, London, England, a British company Application December 11, 1953, Serial No. 397,748

Claims priority, application Great Britain December 15, 1952

2 Claims. (Cl. 308—78)

This invention relates to bearing and journal assemblies for use where there is relative oscillatory movement between the bearing and the journal, for example at the small ends of the connecting rods of internal combustion engines of the piston type.

It has been found in such engines, especially those working on the two stroke cycle where there is a continual compressive load on the connecting rods during operation, that lubrication of the small ends of the connecting rods presents a problem. The reason for this is believed to be that owing to the continual pressure exerted by the underside of the gudgeon pin against the connecting rod small end bearing there is no opportunity for fresh lubricant to penetrate betwen the contacting surfaces, with the result that the bearing tends to run dry after a very short time, no matter how plentiful the supply of lubricant may be.

A solution to this problem is to provide a bearing and journal assembly in which the journal has two distinct arcuate running surfaces spaced apart in the axial direction the axes of curvature of these surfaces being parallel and spaced apart in a plane substantially perpendicular to the centre line of the oscillatory movement, and in which the bearing has two distinct arcuate bearing surfaces which each subtend an angle of less than 180° and which co-operate with the said running surfaces, whereby when the bearing or journal is swung to one side of the said centre line one of the running surfaces engages its corresponding bearing surface while a clearance is created between the other running surface and its corresponding bearing surface, and vice versa when the bearing or journal is swung to the other side of the centre line, means being provided for feeding lubricant into the clearances thus created.

In this way an ample supply of lubricant can penetrate between each running surface and its corresponding bearing surface in each oscillation.

The term "running surface" and the term "bearing surface" employed above do not necessarily mean that the surface in question is all in one piece. For instance, the surface may be divided into two or more parts which are spaced apart in the axial direction. Thus, for example, one running surface and its corresponding bearing surface may be disposed centrally in the middle of the bearing while the other running surface and its corresponding bearing surface may be divided into two parts disposed on opposite sides of the first mentioned running and bearing surfaces.

It is an object of the present invention to provide an improved bearing and journal assembly of the general type referred to.

In this invention shells held in circumferential compression in a part-cylindrical concave recess in a rigid support, and the wall of one of the bearing shells progressively decreases in thickness from one end to the other to afford the requisite off-set of the axis of curvature of its bearing surface relative to the axis of curvature of the other bearing surface. The shell on which the other bearing surface is formed may have a wall of uniform thickness, but it will preferably have a wall which decreases in thickness from one end to the other in the reverse direction to the first-mentioned shell.

The shells may be mounted in the support in the manner described in U. S. Patent No. 2,639,955.

The invention may be carried into practice in various ways, and one specific embodiment comprising the connecting rod small end bearing assembly of a reciprocating two-stroke internal combustion engine will be described by way of example with reference to the accompanying drawings, in which:

Figure 5 is a cross-section on the plane A—A in Figure 1, with the connecting rod central;

Figure 6 is a cross-section on the plane A—A in Figure 1, with the connecting rod swung to the right;

Figure 7 is a cross-section on the plane B—B in Figure 1, with the connecting rod swung to the right.

Figure 1:
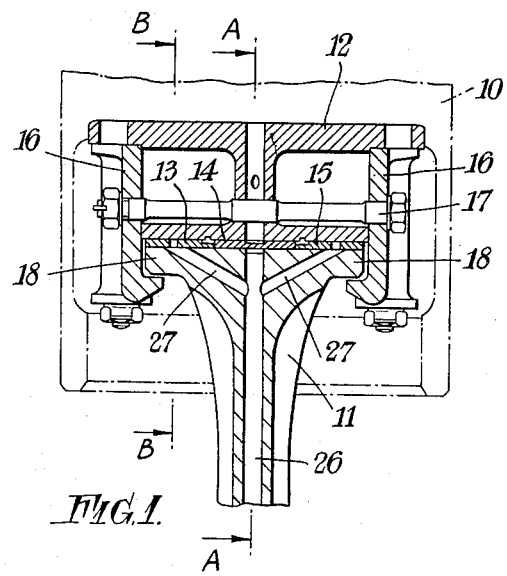
Figure 1 is a section through the bearing assembly on a plane containing the axis of the small end bearing.
Figure 2:
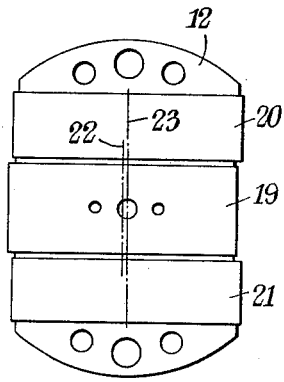
Figure 2 is an inverted plan view of the gudgeon.

This embodiment of the invention will be described on the assumption that the cylinder is vertical with the cylinder head uppermost, but it will be appreciated that the invention can be applied irerspective of the attitude of the cylinder.

In the drawings the lower part of the piston 10 is shown in chain lines. The pressure on the crown of the piston 10 is such that during normal running there is always a downward force acting on the small end 11 of the connecting rod. A half-round gudgeon 12 is fixed in the piston with its convex surface downwards. The small end 11 of the connecting rod has formed in it a plain concave recess carrying three bearing shells 13, 14 and 15, arranged side by side, each of which subtends an angle of substantially less than 180°.

For retaining the connecting rod in contact with the gudgeon 12 should the aforementioned downward force no longer apply, for instance when the engine is being driven to start it, hook members 16 are bolted to the ends of the gudgeon 12 by a through-bolt 17. The hook members 16 hook behind shoulders 18 formed on the axial extremities of the small end 11 of the connecting rod, there being a slight clearance between the hook members and these shoulders. Alternatively the gudgeon 12 could be replaced by a gudgeon pin of circular cross-section, and a strap could be provided on the connecting rod to pass over the top of the gudgeon pin with a small clearance.

The gudgeon 12 is divided into three running surfaces a wide central running surface 19 and two end running surfaces 20 and 21, each somewhat narrower than the central running surface.

The central running surface 19 is ground to semi-cylindrical form about one axis of curvature 22, while the end running surfaces 20 and 21 are each ground to semi-cylindrical form of the same radius but about another axis of curvature 23 which is parallel with the axis 22 but displaced sideways therefrom. Looking at the end of the gudgeon 12, it will appear as two over-lapping half-cylinders, one being slightly offset sideways with respect to the other.

The two distinct semi-cylindrical running surfaces 19 and 20, 21 can readily be formed by turning or grinding the gudgeon between two different centres coinciding respectively with the two axes of curvature 22 and 23.

The three thin-wall bearing shells 13, 14 and 15 mounted in the concave recess in the small end of the connecting rod have concave inner surfaces arranged to provide bearing surfaces corresponding respectively to the running surfaces 20, 19 and 21 of the gudgeon. These shells are retained in place by abutments 24 and 25 running across the connecting rod at the edges of the said concave recess. The shells are a force fit between the abutments 24 and 25 so that they are in circumferential compression and seat firmly against the concave recess, which provides the necessary rigidity. This manner of mounting is described in U. S. A. Patent No. 2,639,955 referred to above.

Figure 3:
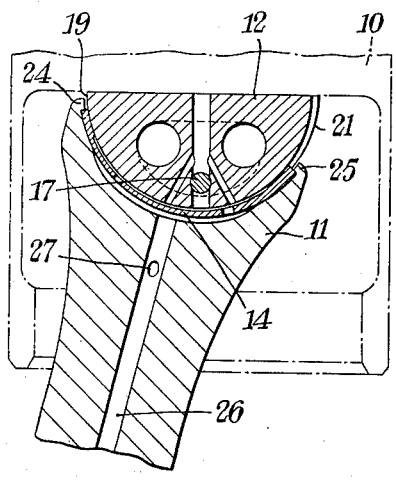
Figure 3 is a cross-section on the plane A—A in Figure 1, with the connecting rod swung to the left.
Figure 4:
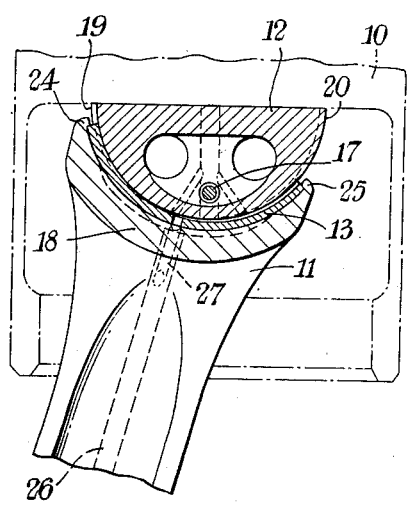
Figure 4 is a cross-section on the plane B—B in Figure 1, with the connecting rod swung to the left.

In order to afford the necessary offsetting of the axes of curvature, the shells are formed so that they progressively decrease in thickness from one end to the other, the thicker ends of the two outer bearing shells 13 and 15 being to the left of the connecting rod as shown in Figures 4 and 7, while the thicker end of the central bearing shell 14 is to the right of the connecting rod as shown in Figures 3, 5 and 6. One way of so shaping the shells is by starting with shells having walls of uniform thickness, placing these shells on a rotatable mandrel and grinding away some of the backs of the shells with the axis of the mandrel off-set from its axis of rotation in the grinding machine.

Another way of making the bearing shells is to use backing strips of a width equal to the length of the shells and which are slightly wedge-shaped in cross-section, then to cut off lengths equal to the width of the shells, and then to bend these wedge-section strips the desired curvature, thus producing shells which are thicker at one end than the other.

It is preferable to adjust the thickness of the shells from the back rather than from the bearing surface, since the layer of relatively soft bearing metal should be of a uniform thinness.

The extreme ends of each bearing surface may be somewhat relieved by chamfers, in order to prevent the ends from fouling the corresponding gudgeon running surface when the connecting rod is swung into its extreme position of oscillation on the side in which a clearance is created between these surfaces, as described below.

Running up the centre of the connecting rod is an oil passage 26 having branches 27 at its top end leading to oil holes in the three bearing shells through which oil under pressure can be supplied.

The arrangement works as follows. When the connecting rod is swung to the left as shown in Figures 3 and 4, the central bearing shell 14 seats properly on the central running surface 19 of the gudgeon, but the outer bearing shells 13 and 15 will be slightly lowered away from the outer running surfaces 20 and 21, thereby providing slight clearances between these bearing shells and the running surfaces as seen in Figure 4. Lubricant can therefore penetrate freely into these clearances from the oil passage 26 and the branches 27.

When the connecting rod swings back to the right it passes through the dead centre position as shown in Figure 5, in which all three bearing shells seat properly on the corresponding running surfaces of the gudgeon. As the connecting rod moves into its extreme right position as shown in Figures 6 and 7 the outer bearing shells 13 and 15 remain seated on the outer running surfaces 20 and 21 of the gudgeon, but the inner bearing shell 14 is slightly lowered away from the inner running surface 19 of the gudgeon, thus providing a slight clearance between this bearing shell and the running surface 19, into which lubricant can penetrate freely from the oil passage 26.

In this manner all the bearing and running surfaces are adequately lubricated in each oscillation.

What I claim as my invention and desire to secure by Letters Patent is:

1. A bearing and journal assembly in which the relative movement between the bearing and the journal is oscillatory and there is a substantially continuous and unidirectional pressure of one against the other, said assembly comprising a journal formed to provide two distinct arcuate running surfaces spaced apart in the axial direction, the axes of curvature of said surfaces being parallel and spaced apart in a plane substantially perpendicular to the center line of the oscillatory movement, a bearing consisting of a rigid support having a part-cylindrical concave recess subtending an angle of less than 180° in said rigid support, and at least two thin wall concave bearing shells held side by side in circumferential compression in said recess, at least one of said bearing shells progressively diminishing in thickness from one end to the other, the concave faces of said bearing shells providing two distinct arcuate bearing surfaces whose axes of curvature are spaced apart in a plane substantially perpendicular to the center line of the oscillatory movement and which respectively engage said arcuate running surfaces of the journal.

2. A bearing and journal assembly as claimed in claim 1 in which all said bearing shells progressively diminish in thickness from one end to the other, the thin end of a bearing shell which forms one of said arcuate bearing surfaces being adjacent to the thick end of a bearing shell which forms the other of said arcuate bearing surfaces.

References Cited in the file of this patent

UNITED STATES PATENTS 2,639,955     Tyron                May 26, 1953

FOREIGN PATENTS 547,938     Germany             Apr. 5, 1932